United States Patent
Tener et al.

(10) Patent No.: US 9,772,255 B1
(45) Date of Patent: Sep. 26, 2017

(54) OPTICAL ELEMENT SURFACE ALTERATION TO CORRECT WAVEFRONT ERROR

(71) Applicant: Lockheed Martin Corporation, Bethesda, MD (US)

(72) Inventors: Gene D. Tener, Oviedo, FL (US); Clara R. Baleine, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 16 days.

(21) Appl. No.: 14/556,517

(22) Filed: Dec. 1, 2014

(51) Int. Cl.
 *G02B 3/00* (2006.01)
 *G01M 11/00* (2006.01)
 *G02B 5/10* (2006.01)

(52) U.S. Cl.
 CPC ............... *G01M 11/00* (2013.01); *G02B 3/00* (2013.01); *G02B 5/10* (2013.01)

(58) Field of Classification Search
 CPC ............. G02B 3/00; G02B 5/10; G01M 11/00
 See application file for complete search history.

(56) References Cited

U.S. PATENT DOCUMENTS

| | | | |
|---|---|---|---|
| 7,352,452 B2 * | 4/2008 | Wegmann | G01J 9/00 356/124 |
| 8,273,832 B2 * | 9/2012 | McCloskey | C08G 63/672 525/404 |
| 2004/0061868 A1 | 4/2004 | Chapman et al. | |
| 2010/0209857 A1 * | 8/2010 | Martinez | G03F 7/70383 430/322 |
| 2012/0310340 A1 * | 12/2012 | Knox | A61F 2/1627 623/6.37 |

OTHER PUBLICATIONS

Author Unknown, "Adaptive optics," Wikipedia.com, last modified Sep. 8, 2014, accessed on Sep. 23, 2014, 6 pages.
Krug, Peter A. et al., "Directly photoinscribed refractive index change and Bragg gratings in Ohara WMS-15 glass ceramics," Applied Optics, vol. 48, No. 18, Jun. 20, 2009, pp. 3429-3437.

* cited by examiner

*Primary Examiner* — Queenie Dehghan
(74) *Attorney, Agent, or Firm* — Withrow & Terranova, PLLC

(57) ABSTRACT

Methods and mechanisms for correcting a wavefront error in an optical element are disclosed. A wavefront error that is downstream of an optical element in an optical path is determined. A refractive index prescription that reduces the wavefront error is determined. A beam of energy is directed at a surface of the optical element in accordance with the refractive index prescription to alter the surface to change an index of refraction at multiple locations on the surface.

13 Claims, 9 Drawing Sheets

OPTICAL ELEMENT SURFACE ALTERATION TO CORRECT WAVEFRONT ERROR

TECHNICAL FIELD

The embodiments relate generally to correcting optical elements that cause aberrations in electromagnetic radiation, and in particular to surface alterations of an optical element to correct downstream wavefront error.

BACKGROUND

Optical elements that direct electromagnetic radiation (EMR) along an optical path inevitably introduce some aberrations in the wavefront of the EMR. Such aberrations will be referred to herein as wavefront error (WFE). WFE degrades the performance of components in the optical path that utilize the EMR in some manner, such as a focal plane array or other sensor. For this reason, optical elements are often polished or otherwise manufactured to extremely tight tolerances, in an effort to ensure the highest performance possible.

Unfortunately, there is a direct correlation between manufacturing high-quality optical elements and the corresponding costs of the optical elements; so, requirements for extremely tight tolerances substantially increase the costs of such optical elements. Moreover, even where optical elements are successfully manufactured to extremely tight tolerances, when assembled in an optical assembly with other optical elements, each optical element and mounting element may introduce relatively small WFEs that accumulate into a relatively substantial WFE. This is sometimes referred to as "tolerance stacking." Also, in some circumstances, the optical materials themselves can exhibit inhomogeneity such that even if ground to an ideal surface, the optical element may still introduce some WFE. Finally, in some applications, the optical assembly may receive EMR that has passed through one or more upstream optical elements, such as a window pane, that may also introduce WFE independent of the optical assembly.

SUMMARY

The embodiments relate to processes and mechanisms for altering a surface of an optical element to correct wavefront error (WFE) caused by the optical element, or caused by other upstream or downstream optical elements. In some embodiments, the process is closed-loop, such that a WFE is determined and the surface of the optical element is altered by an integrated system that eliminates a need to physically move the optical element between one device that determines the WFE and another device that alters the surface of the optical element to correct the WFE. In some embodiments, the process may be in-situ, such that the WFE associated with an entire optical assembly comprising a plurality of optical elements, and/or other related optical elements that may also be in an electromagnetic radiation (EMR) path, is determined, and one or more surfaces of optical elements are altered to correct such WFE. Among other advantages, the embodiments allow optical elements to be manufactured to substantially lower tolerances, reducing time and costs to produce such optical elements.

In one embodiment, a method for correcting a wavefront error in an optical element is provided. A wavefront error that is downstream of an optical element in an optical path is determined. A refractive index prescription that reduces the wavefront error is determined. A beam of energy is directed at a surface of the optical element in accordance with the refractive index prescription to alter the surface to change an index of refraction at multiple locations on the surface.

In one embodiment, the optical element comprises a layer of material fixed to a lens or a mirror. In one embodiment, the optical element is integrated into an optical assembly comprising a plurality of optical elements, and the wavefront error is due to aberrations in at least two optical elements.

In one embodiment, the beam of energy comprises an ion beam. In another embodiment, the beam of energy comprises a laser beam.

In one embodiment, the optical element comprises a glass-ceramic material.

In one embodiment, the beam of energy is directed at the surface of the optical element in accordance with the refractive index prescription to form openings in the surface of the optical element to change the index of refraction at the multiple locations on the surface.

In another embodiment, the beam of energy is directed at the surface of the optical element in accordance with the refractive index prescription to alter a state of the multiple locations on the surface from an amorphous state to a crystalline state.

In another embodiment, a system is provided. The system includes a wavefront error determination component that is configured to determine a wavefront error that is downstream of an optical element in an optical path. The system further includes a processor that is configured to determine a refractive index prescription that reduces the wavefront error. An energy beam source is configured to direct a beam of energy at a surface of the optical element in accordance with the refractive index prescription to alter the surface to change an index of refraction at multiple locations on the surface.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The phrases "index of refraction" and "refractive index" are used synonymously herein.

The embodiments relate to processes and mechanisms for altering the surface of an optical element to correct wavefront error (WFE) caused by the optical element, or caused by other upstream or downstream optical elements. In some embodiments, the process is a closed-loop process, such that a WFE is determined and the surface of the optical element is altered by an integrated system that eliminates a need to physically move the optical element between one device that determines the WFE and another device that alters the surface of the optical element to correct the WFE. In some embodiments, the process may be in-situ, such that the WFE associated with an entire optical assembly comprising a plurality of optical elements, and/or other related optical elements that may also be in a path of electromagnetic radiation (EMR), is determined, and one or more surfaces of optical elements are altered to correct such WFE. The phrase "surface" as used herein refers to an outer portion, or layer, of some depth, of an optical element. Among other advantages, the embodiments allow optical elements to be manufactured to substantially lower tolerances, reducing time and costs to produce such optical elements. The embodiments have applicability to optical elements that are transparent to EMR in the particular wavelength or band of wavelengths of interest, and to optical elements that are reflective of EMR in the particular wavelength or band of wavelengths of interest.

Figure 1:
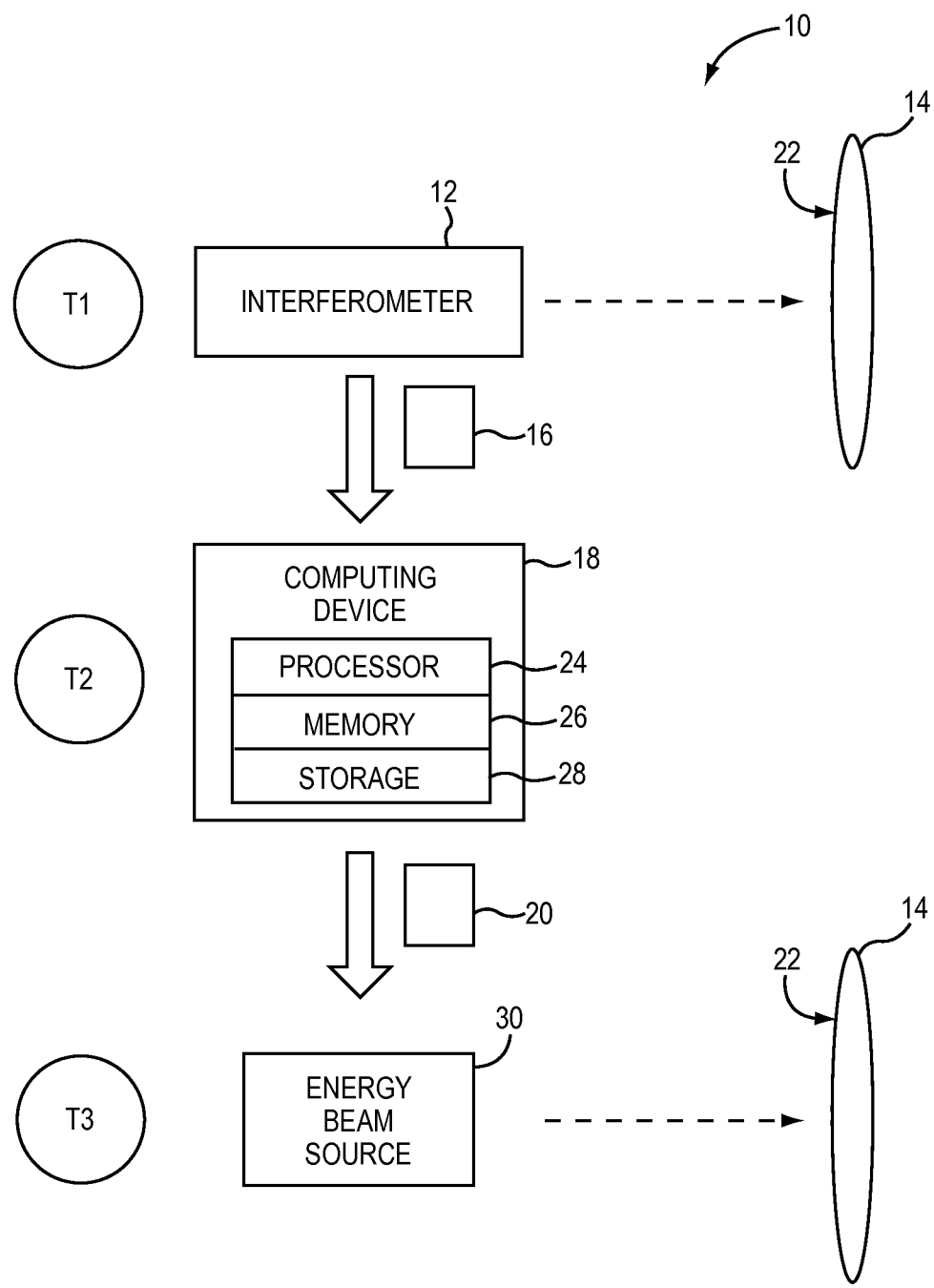
FIG. 1 is a block diagram that illustrates a system according to one embodiment.

FIG. 1 is a block diagram that illustrates a system 10 according to one embodiment. The system 10 includes a WFE determination component, in this example an interferometer 12, which is capable of determining a WFE associated with one or more optical elements 14. While for purposes of illustration an interferometer will be discussed herein, the WFE determination component can comprise any device that is capable of determining a WFE associated with an optical element. In some embodiments, a respective optical element 14 is transparent to EMR in a particular wavelength or a band of particular wavelengths of interest. Generally, the discussion herein will relate to infrared (IR) wavelengths, but the embodiments are not limited to any particular wavelengths of EMR. The optical element 14 comprises a material, or materials, suitable for the particular wavelengths of interest, such as, by way of non-limiting example, germanium, silicon, silicon dioxide, and the like. In other embodiments, the respective optical element 14 may be reflective of EMR in a particular wavelength or a band of particular wavelengths of interest.

The interferometer 12 at a time T1 operates to determine the WFE associated with the optical element 14. As will be discussed in greater detail herein, the WFE may be caused by the optical element 14, caused by upstream optical elements (not illustrated) that are in the path of EMR that travels through the optical element 14, caused by downstream optical elements (not illustrated) that are in the path of EMR that travels through the optical element 14, or caused by any combination of the above. The interferometer 12 generates data 16, such as an interferogram, that quantifies the WFE in a particular format.

A computing device 18 receives the data 16 and at a time T2 processes the data 16 to determine a refractive index prescription 20 that identifies changes to be made to a surface 22 of the optical element 14 to correct the WFE. Example processing suitable for determining the prescription 20 will be discussed in greater detail herein. The computing device 18 can comprise a general purpose or special purpose computing device, and includes one or more microprocessors or processors 24, a memory 26, and a storage 28.

At a time T3, an energy beam source 30 directs a beam of energy at the surface 22 of the optical element 14 in accordance with the refractive index prescription 20 to alter the surface 22 to change an index of refraction at multiple locations on the surface 22. The energy beam source 30 may emit, in some embodiments, an ion beam or a laser beam.

Figure 2:
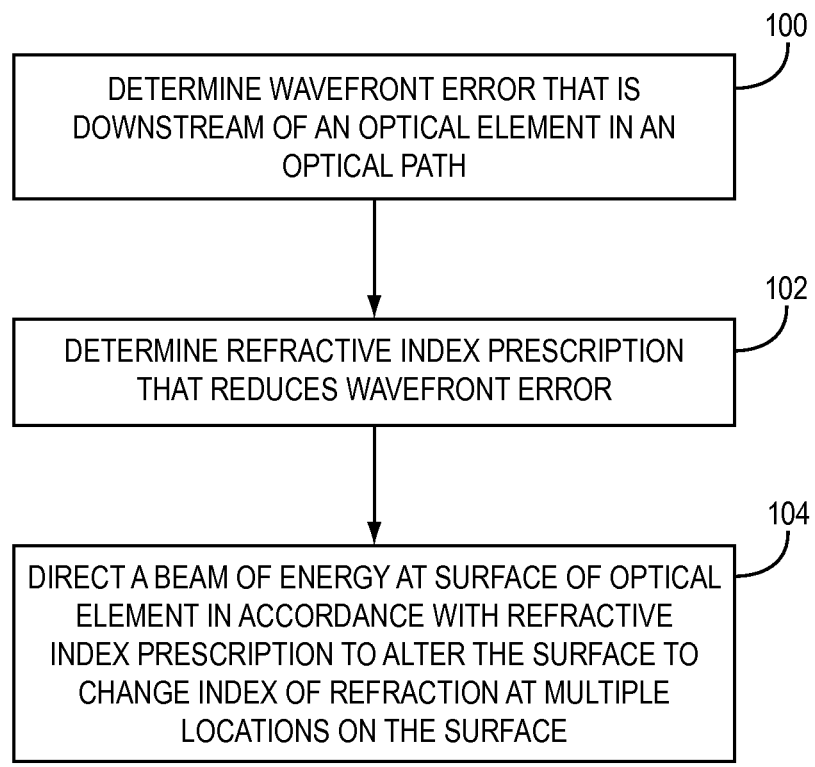
FIG. 2 is a flowchart of a method for altering a surface of an optical element according to one embodiment.

FIG. 2 is a flowchart of a method for altering a surface of an optical element according to one embodiment. FIG. 2 will be discussed in conjunction with FIG. 1. The interferometer 12 determines a WFE that is downstream of the optical element 14 in an optical path (FIG. 2, block 100). The optical element 14 comprises, for example, a lens, a mirror, or another surface that has been manufactured to a particular prescription within certain tolerances. The computing device 18 determines the refractive index prescription 20 that reduces the WFE (FIG. 2, block 102). The energy beam source 30 directs a beam of energy at the surface 22 of the optical element 14 in accordance with the refractive index prescription 20 to alter the surface 22 to change the index of refraction at multiple locations on the surface 22, and to thereby correct or reduce the WFE (FIG. 2, block 104).

Figure 3:
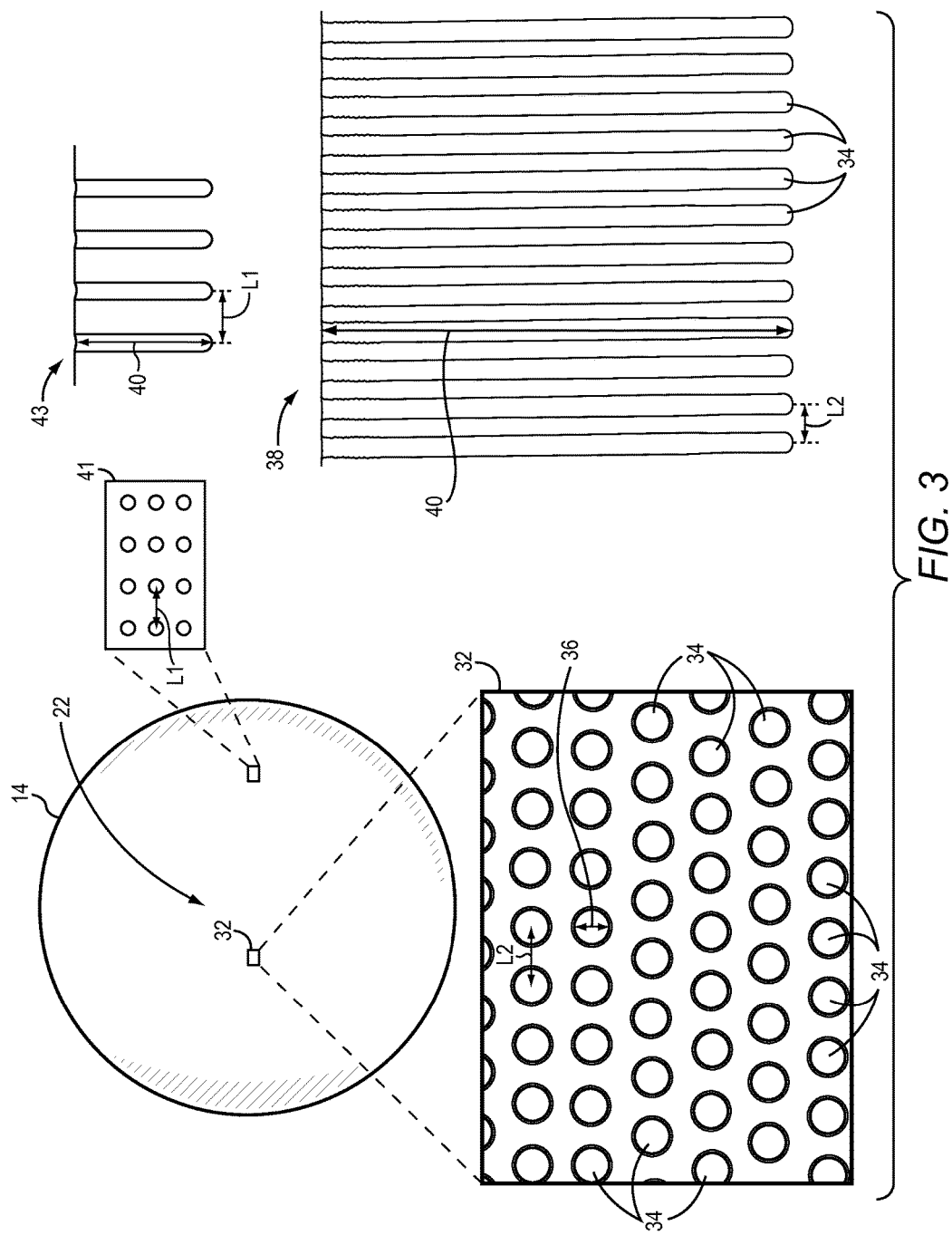
FIG. 3 is a block diagram that illustrates a portion of the surface of the optical element illustrated in FIG. 2.

In one embodiment, the surface 22 is altered by forming openings in the surface 22 to alter the porosity of the surface 22 and thereby alter the refractive index of the surface 22. In this regard, FIG. 3 is a block diagram that illustrates a portion of the surface 22 of the optical element 14 which has been altered by forming openings in the surface 22. In this example, a portion 32 of the surface 22 has been enlarged (not to scale) to illustrate a plurality of pits 34 of a calculated diameter 36, that have been formed in the surface 22. An inset 38 illustrates a cross-sectional view of some of the pits 34, wherein the pits 34 have a calculated depth 40. The combination of the diameter 36, a distance between the pits 34, and the calculated depth 40 are determined and then formed in the surface 22 to alter the porosity of the surface 22 such that the refractive index at various locations of the surface 22 is changed to reduce or eliminate WFE. In some embodiments, the diameter 36 may be less than about half the wavelength of the EMR of interest, in order to minimize scattering. In some embodiments, the diameter (D) 36 and/or pitch (L) of the pits 34 differs radially across the surface 22 in accordance with the refractive index prescription. A portion 41 illustrates a portion of the surface 22 that is closer to an edge of the optical element 14. A pitch L1 between the centers of the pits 34 in the portion 41 is greater than a pitch L2 between the centers of the pits 34 in the portion 32. An inset 43 illustrates a cross-sectional view of some of the pits 34 in the portion 41, wherein the pits 34 have the calculated depth 40 and the pitch L1.

Figure 4:
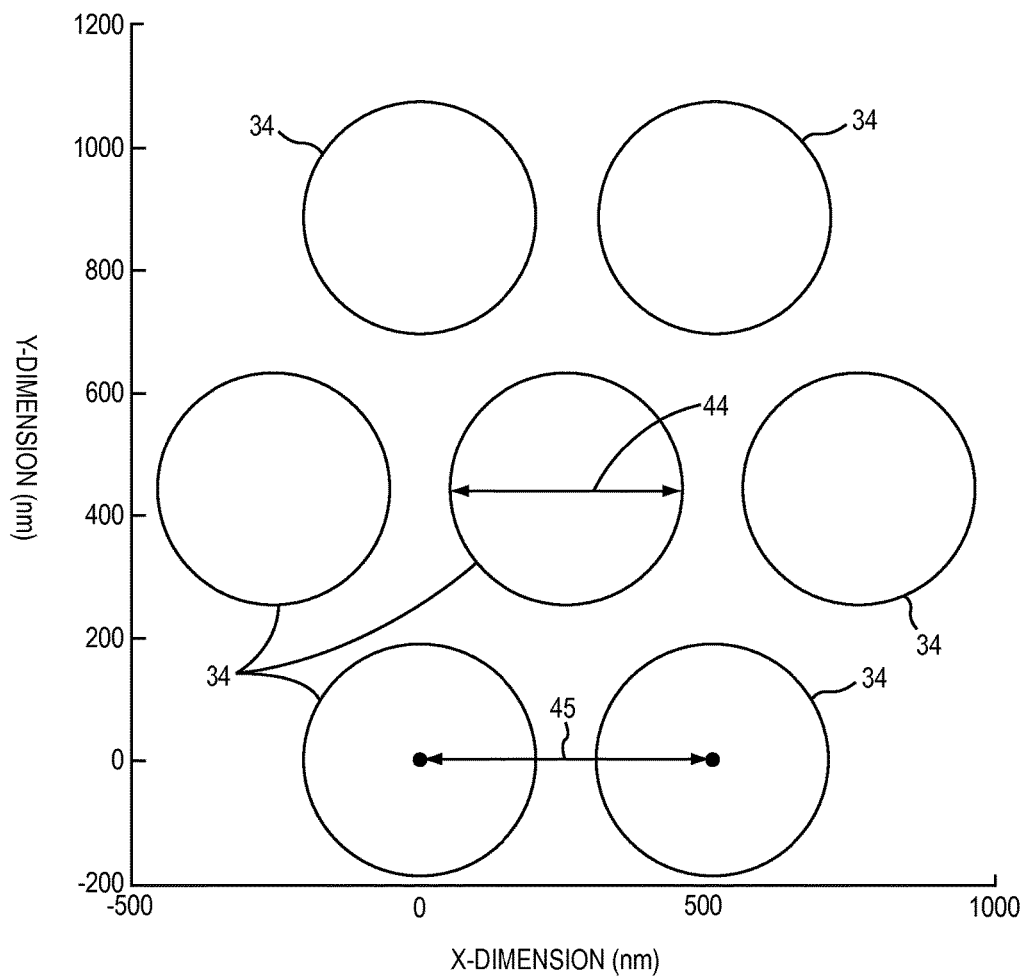
FIG. 4 is a graph illustrating sizing and spacing of example pits in a hexagonal air-hole array pattern in accordance with one embodiment.

FIG. 4 is a graph illustrating sizing and spacing of example pits 34 in a hexagonal air-hole (sometimes referred to as a "pillar") array pattern in accordance with one embodiment to correct WFE. In this embodiment, the wavelengths of interest are in the infrared waveband, but the embodiments are not limited to any particular waveband. Preliminarily, information that identifies the WFE can be obtained from the interferometer 12 (FIG. 1). A ray tracing tool, such as Code V®, available from Synopsys, 700 East Middlefield Road, Mountain View, Calif. 94043, or OpticStudio™, available from Zemax, LLC, 22908 NE Alder Crest Drive, Suite 100, Redmond, Wash. 98053, or other functionally similar tools can be used to determine Zernike coefficients that describe the WFE. The Zernike coefficients can be used to determine the refractive index prescription 20. Specifically, at a high level, the phase difference, $\Delta \phi$ can be determined using the following formula:

$$\Delta \varphi = \frac{2\pi}{\lambda} \Delta n \cdot t,$$

wherein $\lambda$ is wavelength, $\Delta n$ is change in refractive index, and t is thickness of a coating layer if there is a coating layer; otherwise, t represents the depth of the feature, such as pits or nanocrystals, into the native material of the optical element.

The WFE can be reconstructed from the Zernike coefficients, and can then be converted into an equivalent refractive index map ($\Delta n(x,y)$), which identifies the WFE in terms of change in refractive index and which can have an arbitrary distribution along the X,Y axes of the surface of the optical element.

A complementary refractive index, referred to as $n_{eff}$, is then determined to correct for the WFE, utilizing the following formula:

$$n_{eff} = n_{substrate} + \frac{\pi D^2}{2\sqrt{3} \cdot L^2}(n_{air} - n_{substrate}),$$

wherein $n_{substrate}$ is the refractive index of the substrate, or in embodiments where a coating is applied to the optical element as described in greater detail herein, the refractive index of the coating material; D is a diameter 44 of a pit 34; and L is a pitch 45 that identifies a distance between the center of two pits 34. The values of the variables D and L can be varied at each location on the surface of the optical element to determine $n_{eff}$ at each location to derive the appropriate refractive index prescription.

The complementary refractive index is the refractive index prescription that is used by the energy beam source 30 (FIG. 1) to form pits 34 in the surface 22 to alter the refractive index of the surface 22 to correct the WFE.

Figure 5:
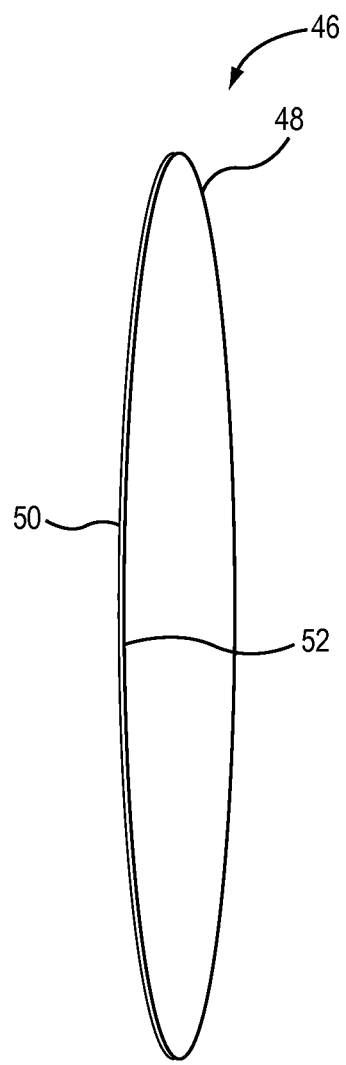
FIG. 5 is a block diagram that illustrates an optical element according to another embodiment.

FIG. 5 is a block diagram of an optical element 46 according to another embodiment. The optical element 46 may be substantially similar to the optical element 14 described above, except as otherwise discussed herein. In this embodiment, the optical element 46 includes a lens 48 and a layer of material 50 that is coated or otherwise formed on at least one surface 52 of the lens 48. In one embodiment, the lens 48 is first formed in accordance with a particular prescription to a particular tolerance, and the surface 52 is then coated with a uniform layer of the material 50. The lens 48 may comprise any suitable material that is transparent to the wavelength or band of wavelengths of interest. As an example, with respect to IR wavelengths, the lens 48 may comprise germanium, silicon, silicon dioxide, or the like. In one embodiment, the material 50 comprises a glass-ceramic material that has multiple states, including an amorphous state and a crystalline state. The material 50 has one refractive index when in the amorphous state and another refractive index when in the crystalline state. The material 50 thereby forms a surface of the optical element 46 that may be altered to correct WFE associated with the optical element 46. In particular, locations within the material 50 can be targeted by the energy beam source 30, such as a laser, in accordance with the refractive index prescription, to alter the locations from the amorphous state to the crystalline state to thereby alter the refraction of index and correct WFE. The material 50 may be reconfigurable, such that locations in the material 50 can change states multiple times, or the material 50 may be non-reconfigurable, such that the material 50 can change states only once. In other embodiments, the material 50 may comprise, for example, arsenic trisulfide ($As_2S_3$). In such embodiments, the arsenic trisulfide may operate as a photoresist, such that laser radiation polymerizes the arsenic trisulfide and non-polymerized portions can be etched away.

Figure 6:
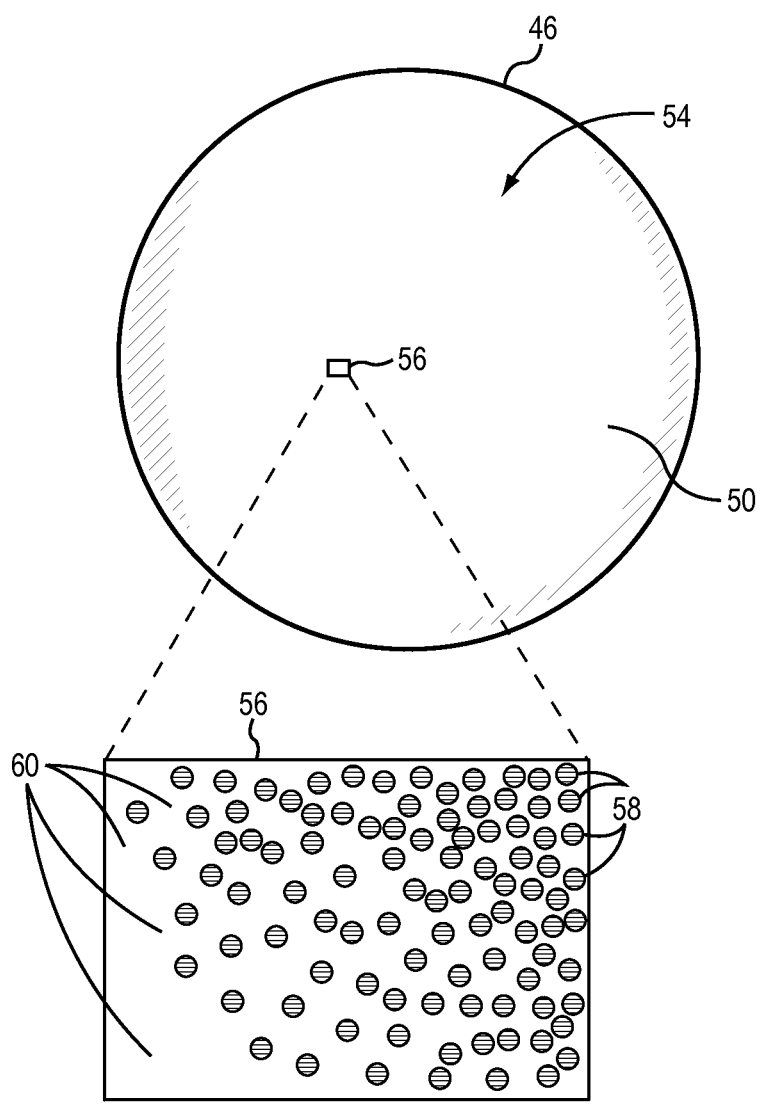
FIG. 6 is a block diagram that illustrates a portion of a surface of the optical element illustrated in FIG. 5.

FIG. 6 is a block diagram that illustrates a portion of a surface 54 of the optical element 46 that comprises the layer of material 50. In this example, a portion 56 of the surface 54 has been enlarged (not to scale) to illustrate a plurality of relatively high refractive index nanocrystals 58 (only some labelled in FIG. 6) that have been formed in the surface 54. Thus, the surface 54 comprises a plurality of relatively high refractive index nanocrystals 58 formed within a relatively low refractive index glass matrix 60. In this embodiment, processes for determining and identifying the WFE associated with the optical element 46 can be similar to that discussed above with regard to FIG. 4. In particular, an equivalent refractive index map ($\Delta n(x,y)$), which identifies the WFE in terms of change in refractive index, and which can have an arbitrary distribution along the X,Y axes of the surface 54 of the optical element 46, may be generated as discussed above. A complementary refractive index for the locations identified in the equivalent refractive index map, referred to as $n_{eff}$ is then determined to generate the refractive index prescription to correct for the WFE, utilizing the following formula:

$n_{eff} = n_{glass} \times V_{glass} + n_{crystal} \times V_{crystal}$ wherein $n_{glass}$ is the index of refraction of the glass matrix 60 (glass-ceramic material in an amorphous state), $V_{glass}$ is the volume of the glass matrix 60, $n_{crystal}$ is the index of refraction of the nanocrystals 58 (glass-ceramic material in a crystalline state), and $V_{crystal}$ is the volume of the nanocrystals 58.

The refractive index prescription can then be used by the energy beam source 30 (FIG. 1), such as a laser, to form nanocrystals 58 at the identified volume and location within the glass matrix 60 to alter the refractive index of the surface 54 to correct the WFE.

Figure 7:
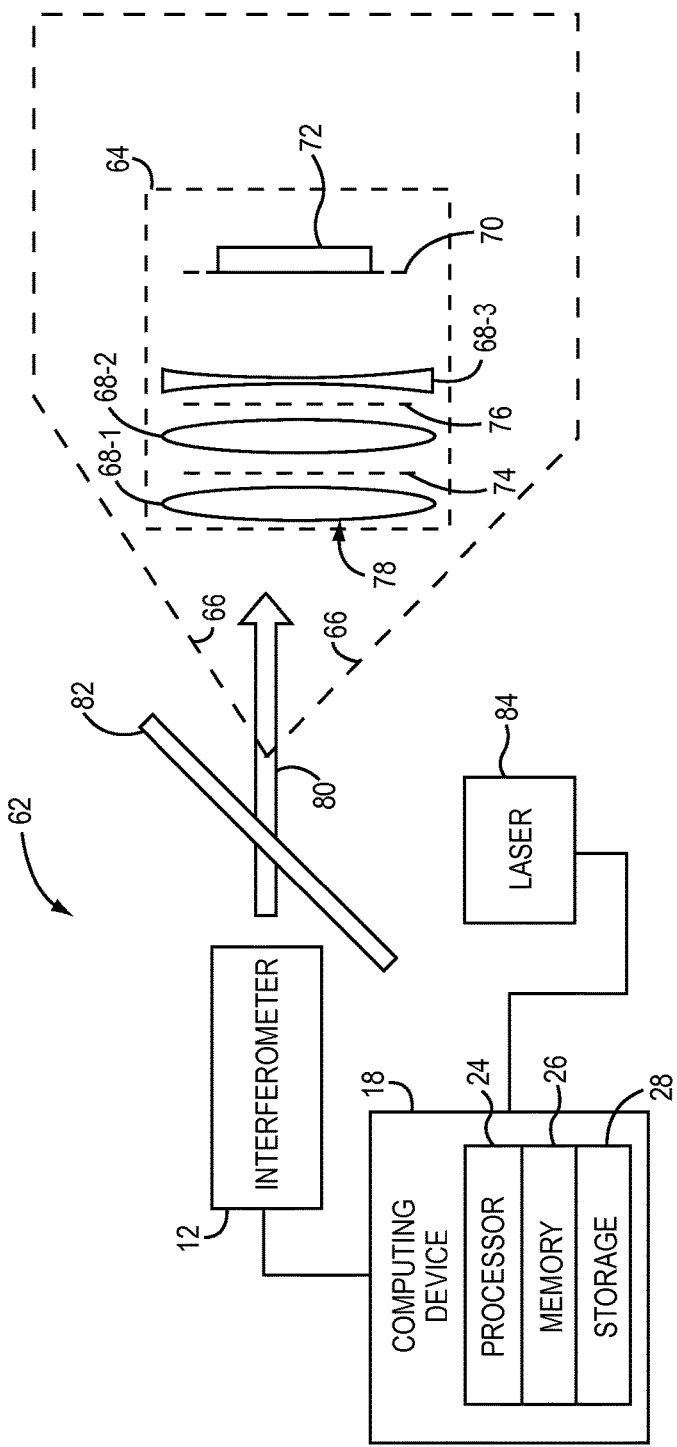
FIG. 7 is a block diagram that illustrates a wavefront error (WFE) correction apparatus that includes a closed-loop system suitable for correcting a WFE identified in an optical assembly.

FIG. 7 is a block diagram that illustrates a WFE correction apparatus according to one embodiment. The WFE correction apparatus includes a closed loop system 62 suitable for correcting a WFE identified in an optical assembly 64. In this embodiment, EMR follows an optical path that passes first through a segmented window 66 prior to reaching the optical assembly 64. Segmented windows often result in a wavefront shift, and thus contribute to WFE. The EMR then passes through a plurality of optical elements 68-1-68-3 (generally, optical elements 68) prior to reaching an image plane 70 at which a device (in this example, a focal plane array 72) is positioned. In other embodiments, other devices, such as a spherical ball bearing, may be located at the image plane 70. A WFE may be determined by a WFE determination component, such as the interferometer 12, at any of various locations within the optical assembly 64, including, for example, a location 74, which might, for example, comprise a pupil plane, a location 76, or the image plane 70. Notably, determining the WFE at the image plane 70 will determine the cumulative, or aggregate, WFE caused by the segmented window 66, and each of the optical elements 68.

For purposes of illustration only, it will be assumed that the interferometer 12 determines the WFE at the image plane 70, and that a surface 78 of the optical element 68-1 will be altered to correct the WFE. The interferometer 12 is initiated, and utilizes a laser beam 80 that passes through an optical element 82 that is transparent to the wavelength of the laser beam 80. The interferometer 12 provides data identifying the WFE, or data from which the WFE can be determined, to the computing device 18. The computing device 18 determines the refractive index prescription in accordance with one of the discussions above. For purposes of illustration, assume that the surface 78 comprises a glass-ceramic material that has multiple states, as discussed with regard to FIG. 6. The computing device 18 then controls a laser 84 to alter the surface 78, as discussed in greater detail with regard to FIG. 8.

Figure 8:
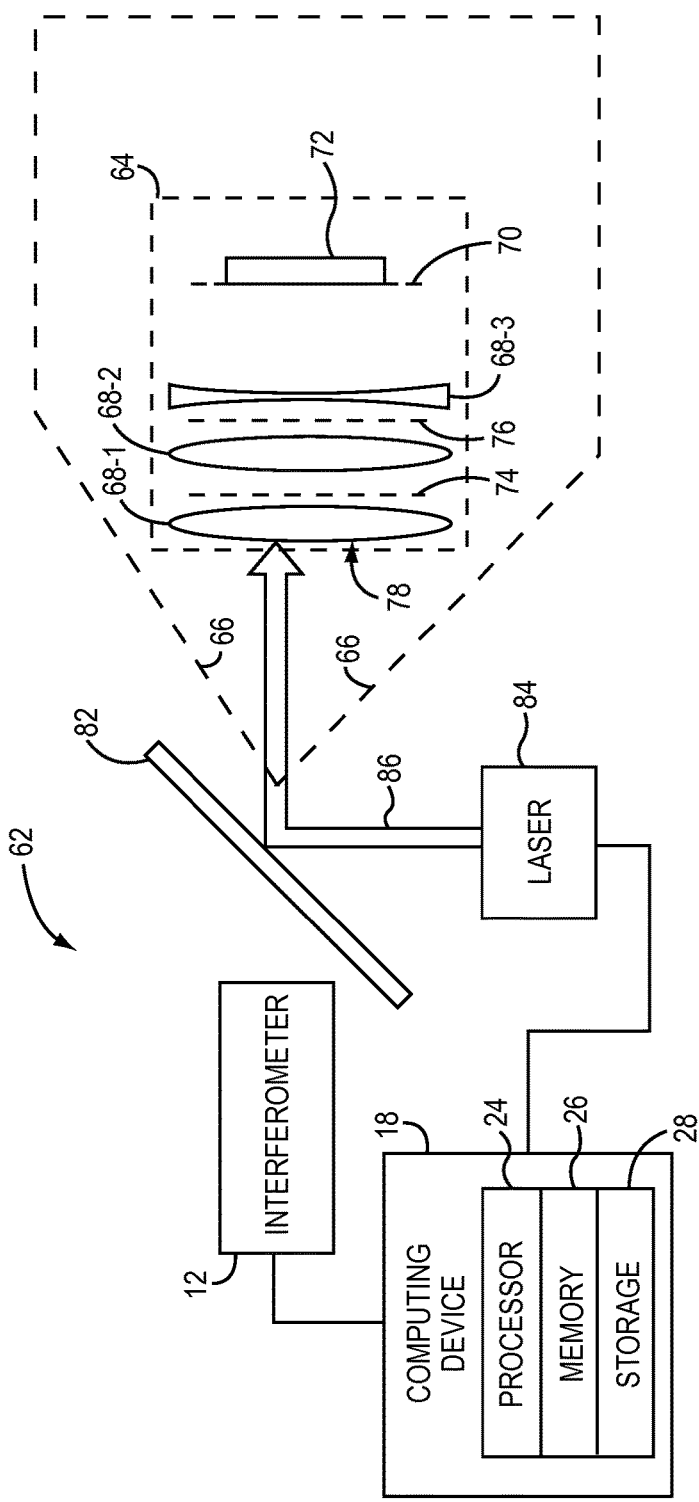
FIG. 8 is a block diagram that illustrates the WFE correction apparatus illustrated in FIG. 7, illustrating a laser emitting a laser beam to alter a surface of an optical element.

FIG. 8 is a block diagram that illustrates the laser 84 emitting a laser beam 86 to alter the surface 78 of the optical element in accordance with the refractive index prescription determined by the computing device 18. Note that the determination of the WFE by the interferometer 12, determination of the refractive index prescription, and operation of the laser 84 occur in relatively rapid succession, and the segmented window 66 and optical assembly 64 remain fixed during this time frame, resulting in a highly accurate alteration of the surface 78 and resulting correction of WFE. In some embodiments, the process may be continued iteratively until the WFE is below a predetermined threshold. Thus, after the laser 84 completes the alteration of the surface 78, the interferometer may again determine the WFE at the image plane 70, and provide data to the computing device 18. If the WFE is not sufficiently small, the computing device 18 may determine a refractive index prescription, and control the laser 84 to alter the surface 78 in accordance with the refractive index prescription to further reduce the WFE. In other embodiments, it may be desirable to include the segmented window 66 in the interferometer path when determining the WFE but to remove the segmented window 66 from the path of the laser beam 86 prior to altering the surface 78.

Figure 9:
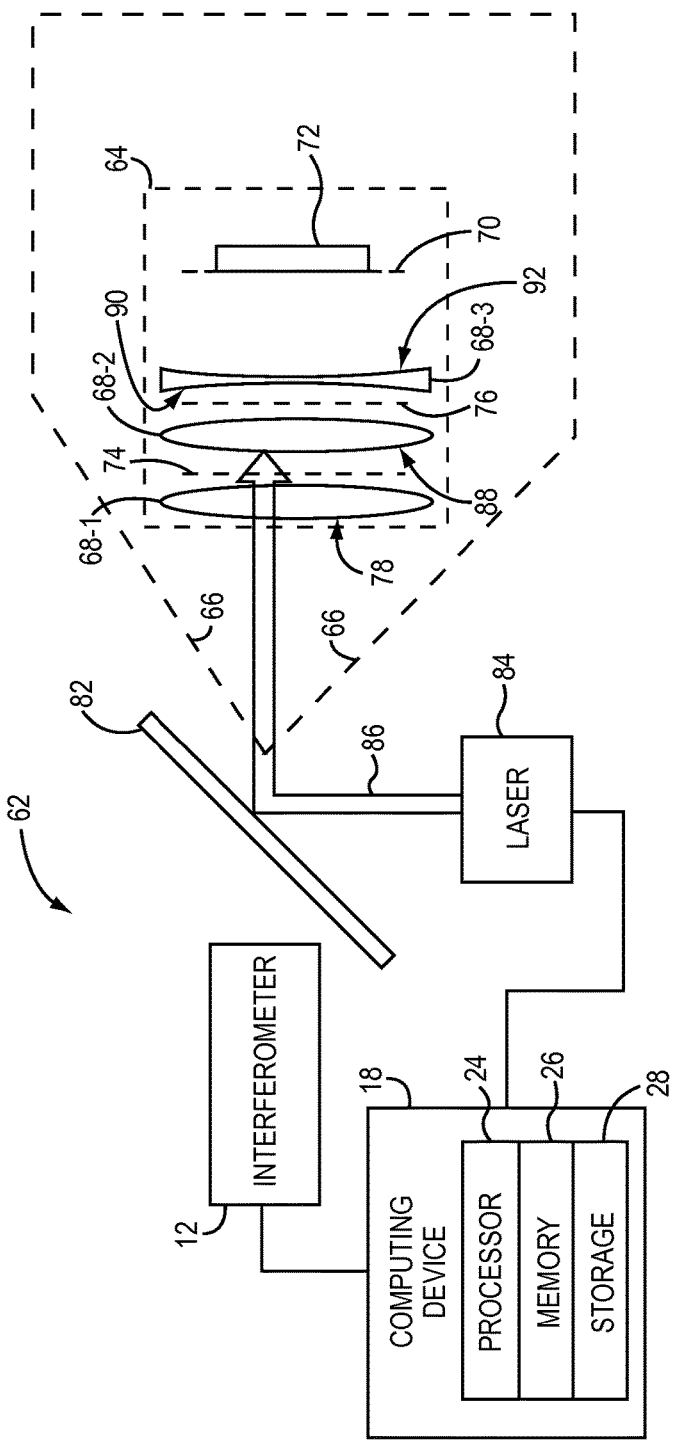
FIG. 9 is a block diagram that illustrates the WFE correction apparatus illustrated in FIG. 7 according to another embodiment.

FIG. 9 is a block diagram illustrating another embodiment in which the laser 84 focuses the laser beam 86 to alter a surface 88 of the optical element 68-2 rather than the surface 78 of the optical element 68-1. In yet other embodiments, the surface 78 may first be altered by the laser 84, and if the WFE is not sufficiently reduced, the surface 88 may then be altered, and if necessary, a surface 90 of the optical element 68-3 subsequently altered. Again, in some embodiments, it may be desirable to include the segmented window 66 in the interferometer path when determining the WFE but to remove the segmented window 66 from the path of the laser beam 86 prior to altering the surfaces 78, 88, 90.

While FIGS. 8 and 9 each illustrate the laser beam 86 entering the optical assembly 64 in a path that first passes through the optical element 68-1, this is merely one option. In other embodiments, one or more reflective surfaces may be utilized, or the optical assembly 64 may be oriented with respect to the laser 84 such that the laser beam 86 first strikes the surface that will be altered. For example, it may be desirable to alter a surface 92 of the optical element 68-3, and the laser beam 86 may be oriented with respect to the optical assembly 64, utilizing one or more reflective surfaces, or otherwise, such that the laser beam 86 impacts the surface 92 without first passing through any other optical element 68.

In one embodiment, the WFE associated with the optical assembly 64 may first be corrected, and then the WFE associated with the segmented window 66 may then be corrected. The WFE associated with the segmented window 66 may be determined and corrected for a plurality of different line-of-sight (LOS) angles. In some embodiments, the optical assembly 64 may be on a gimbal and thus have various LOSs through the segmented window 66. Thus, the WFE of such LOSs through the segmented window 66 can be determined, and corrected, in accordance with the embodiments disclosed herein. In some embodiments, the segmented window 66 may comprise a spherical shape, an ogive shape, an elliptical shape, a Von Karman shape, or any other desired shape.

Among other advantages, the embodiments facilitate the manufacture of optical elements to substantially lower tolerances, reducing time and costs to produce such optical elements. The embodiments also facilitate the correction of WFE in an optical assembly that comprises a plurality of optical elements, each of which may contribute to an overall WFE. For purposes of illustration, the embodiments have been described in terms of particular optical elements and assemblies, but the embodiments are not limited to such particular optical elements and assemblies, and have applicability in any context in which it may be desirable to correct wavefront errors associated with an optical element, including, for example, optical elements implanted in a biological organism, such as in a human eye.

Those skilled in the art will recognize improvements and modifications to the preferred embodiments of the disclosure. All such improvements and modifications are considered within the scope of the concepts disclosed herein and the claims that follow.

What is claimed is:

1. A method for correcting a wavefront error in an optical element, comprising:

determining a wavefront error that is downstream of an optical element in an optical path the optical element having a surface that comprises a glass-ceramic material;

determining a refractive index prescription that reduces the wavefront error substantially in accordance with the following formula at each location of a plurality of locations on the surface:

$n_{eff} = n_{glass} \times V_{glass} + n_{crystal} \times V_{crystal}$, wherein $n_{glass}$ is an index of refraction of the glass-ceramic material in an amorphous state, $V_{glass}$ is a volume of the glass-ceramic material in the amorphous state, $n_{crystal}$ is an index of refraction of the glass-ceramic material in a crystalline state, and $V_{crystal}$ is a volume of the glass-ceramic material in the crystalline state; and directing a beam of energy at the surface of the optical element in accordance with the refractive index prescription to alter the surface to change the index of refraction at the plurality of locations on the surface.

2. The method of claim 1, wherein the optical element comprises a layer of material fixed to a lens or a mirror, and wherein the layer of material comprises the surface.

3. The method of claim 1, further comprising:
mounting the optical element in a wavefront error correction apparatus that comprises:
a processor;
a wavefront error determination component; and
a laser;
initiating the wavefront error determination component to determine the wavefront error that is downstream of the optical element in the optical path;
determining, by the processor and based on the wavefront error, the refractive index prescription that reduces the wavefront error; and
controlling, by the processor, the laser to direct the beam of energy at the surface of the optical element in accordance with the refractive index prescription to alter the surface to change the index of refraction at the plurality of locations on the surface.

4. The method of claim 3, further comprising:
iteratively performing the initiating, determining, and controlling steps until the wavefront error is below a predetermined threshold.

5. The method of claim 1, wherein the optical element is integrated into an optical assembly comprising a plurality of optical elements, and wherein the wavefront error is due to aberrations in at least two optical elements.

6. The method of claim 1, wherein the beam of energy comprises one of an ion beam and a laser beam.

7. The method of claim 1, wherein the glass-ceramic material is reconfigurable.

8. The method of claim 1, wherein directing the beam of energy at the surface of the optical element in accordance with the refractive index prescription to alter the surface to change the index of refraction at the plurality of locations on the surface further comprises:
directing the beam of energy at the surface of the optical element in accordance with the refractive index prescription to alter a state of the plurality of locations on the surface from the amorphous state to the crystalline state.

9. A system comprising:
a wavefront error determination component configured to determine a wavefront error that is downstream of an optical element in an optical path, the optical element having a surface that comprises a glass-ceramic material;
a processor configured to determine a refractive index prescription that reduces the wavefront error substantially in accordance with the following formula at each location of a plurality of locations on the surface:
$n_{eff} = n_{glass} \times V_{glass} + n_{crystal} \times V_{crystal}$, wherein $n_{glass}$ is an index of refraction of the glass-ceramic material in an amorphous state, $V_{glass}$ is a volume of the glass-ceramic material in the amorphous state, $n_{crystal}$ is an index of refraction of the glass-ceramic material in a crystalline state, and $V_{crystal}$ is a volume of the glass-ceramic material in the crystalline state; and
an energy beam source configured to direct a beam of energy at the surface of the optical element in accordance with the refractive index prescription to alter the surface to change an index of refraction at the plurality of locations on the surface.

10. The system of claim 9, wherein the wavefront error determination component comprises an interferometer.

11. The system of claim 9, wherein the beam of energy comprises an ion beam or a laser beam.

12. The system of claim 9, wherein the energy beam source is further configured to direct the beam of energy at the surface of the optical element in accordance with the refractive index prescription to alter a state of the plurality of locations on the surface from the amorphous state to the crystalline state.

13. The system of claim 9, wherein the beam of energy is in the infrared waveband.

* * * * *